Figure 1:
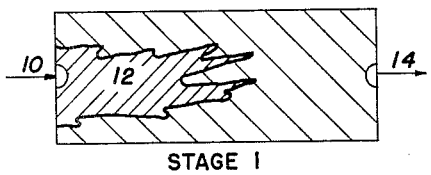
Figure 1:
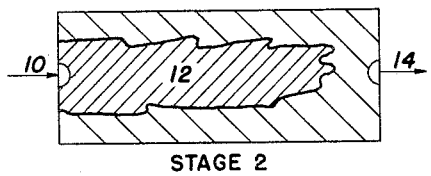
Figure 1:
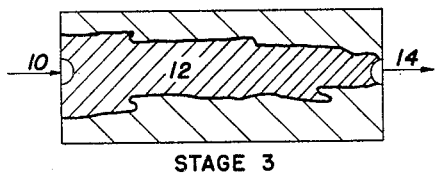
Figure 1:
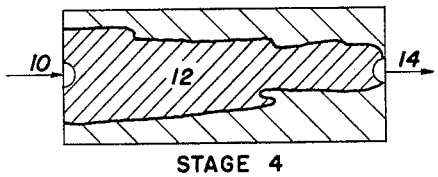

April 7, 1964   A. K. CSASZAR   3,127,934

SOLVENT INJECTION PETROLEUM RECOVERY METHOD

Filed May 18, 1961

STAGE 1

STAGE 2

STAGE 3

STAGE 4

STAGE 1

STAGE 2

STAGE 3

STAGE 4

INVENTOR.
ALBERT K. CSASZAR
BY
ATTORNEY 3,127,934
SOLVENT INJECTION PETROLEUM
RECOVERY METHOD
Albert K. Csaszar, Dundee, Ill., assignor to The Pure Oil Company, Chicago, Ill., a corporation of Ohio
Filed May 18, 1961, Ser. No. 111,060
7 Claims. (Cl. 166—9)

This invention relates to the secondary recovery of oil from partially depleted oil-containing reservoirs, and particularly is concerned with an improved method of recovery in which a solvent is driven through the reservoir by a displacing fluid, such as water, a gas, or combinations of water and a gas.

Processes are known for producing petroleum by the use of water-drive. According to these methods, water or an aqueous liquid is forced under pressure into the formation to displace oil which is produced through one or more producing wells. The art also teaches the injection of a slug of oil-miscible solvent ahead of the flood-water. Sometimes the formation is scrubbed by a plurality of banks or slugs of oil-miscible solvent, as taught by Teter, Patent No. 2,669,306. The oil-miscible solvent may also be soluble in the floodwater, in which case a single-phase displacement of the oil is said to be obtained. Oil-miscible solvents suggested by the prior art include fluids such as liquefiable hydrocarbon gases, petroleum fractions in the naptha and gas-oil ranges, and partially oxidized hydrocarbons, such as alcohols, ketones, aldehydes, organic acids, and esters. In each case, it has been found that the secondary-recovery process must be abandoned when large quantities of oil still remain in the reservoir because the oil can no longer be economically produced due to the very high water-to-oil, or gas-to-oil, ratios at the producing wells, or because the value of the oil produced does not justify the expense of injecting further quantities of fluid into the formation.

While some of the solvent water-drive, secondary-recovery techniques are known to be extremely efficient in recovering petroleum from the zones of the reservoir contacted by the injected fluids, the overall efficiency of the process may be considerably lower due to channeling of the solvent and floodwater through the reservoir, by-passing large reservoir areas. The solvent and displacing fluid tend to form a channel of communication extending from the injection to the producing wells, and while the oil recovery in this channel is excellent, other portions of the reservoir remain virtually untouched. The extent of channeling of the solvent and displacing fluid is determined by various factors, the most important of which is the ratio of the viscosity of the recovered petroleum to the viscosity of the injected solvent. Where such ratios are low, the overall process efficiency is usually excellent. Where the viscosity of the petroleum is high, channeling is very severe, and the overall process efficiency is poor. While it is theoretically possible to improve the efficiency in such cases by employing a solvent which has a viscosity approaching that of the petroleum, as a practical matter no economically feasible solvents are available which are capable of effectively recovering the petroleum from the reservoir rock; furthermore, none are viscous enough to provide a satisfactory viscosity ratio, where the viscosity of the petroleum is high. For example, one of the best and most widely used solvents is L.P.G. (liquefiable petroleum gas) which consists predominantly of propane and butane. This excellent, economical solvent has a low viscosity, and while extremely effective in treating reservoirs containing petroleum oil of low viscosity, suffers a distinct disadvantage when viscous petroleums are encountered.

It is an object of this invention to provide an improved secondary-recovery process by which additional quantities of oil can be recovered from a petroleum-containing reservoir treated by solvent driven by a displacing fluid. It is another object of this invention to provide an improved process by which additional quantities of oil can be recovered from oil-containing reservoirs previously produced by water-flood, without requiring the injection of excessive quantities of fluid into the reservoir. Yet another object of this invention is to provide a secondary-recovery process by which oil can be recovered from reservoirs in a shorter period of time with the injection of smaller quantities of fluid, and at more favorable oil-to-injected-fluid ratios, than is possible by any processes of the prior art.

Briefly, the method of this invention comprises injecting into an injecton well a quantity of petroleum solvent sufficient to seek out, but not fully establish, the paths of flow which would ordinarily lead to breakthrough of the injected solvent at the producing well. A material capable of forming a formation plugging product upon reaction with water is then injected. A second quantity of petroleum solvent is injected into the formation, and followed by a fluid-drive, such as a water-drive. Petroleum is produced in the normal manner at the producing wells.

The solvent to be used in the recovery method of this invention must be highly soluble in, and preferably miscible with, the petroleum contained in the reservoir, and further must be anhydrous. Such solvents may be selected from numerous classes of materials including petroleum fractions, such as those boiling in the gasoline boiling range, naphtha, gas oil, etc., especially light liquefiable hydrocarbons, such as propane and butane, which are injected in liquid form. Other non-hydrocarbon materials include alcohols, ketones, and aldehydes which are highly soluble in petroleum, such as propyl, butyl and amyl alcohols, methyl ethyl ketone, diethyl ketone, methyl propyl ketone, butyl aldehyde, amyl aldehyde, and furfural.

Various plugging agents are available which will react with water, or which will polymerize in the presence of water, to form a formation-plugging product. Especially preferred are gaseous plugging agents, such as silicon tetrafluoride. However, various other plugging agents, well known in the art, may be employed. The plugging agent may be injected alone, or in solution in a carrier. For example, beta-propiolactone, which polymerizes on contact with water to form a formation-plugging polymer, may be injected in 10 to 50% by weight solution in a suitable liquid carrier, such as a hydrocarbon, or one of the lower alcohols, ketones, or aldehydes. The second injected solvent may be the same material as the first injected solvent, or may be another material selected from the enumerated solvents, or similar solvents, which are highly soluble in the petroleum to be recovered. The displacing fluid is then injected and petroleum is recovered at the producing wells.

The initially injected petroleum solvent must be in sufficient quantity to seek out those zones of the reservoir which would become flow channels establishing communication between the injection and producing wells, if additional quantities of solvent, or solvent-driving fluid, were injected. The first-injected solvent thus serves to locate the more permeable zones of the formation structure, and further serves to drive formation water from a zone extending radially outward from the injection well. Accordingly, upon injection of the material capable of reaction in the presence of water to form a formation plug, no reaction in fact occurs until the formation-plugging constituents have passed a substantial distance through the reservoir from the injection well, and have entered the channels sought out by the previously injected solvent, whereupon substantial quantities of water are contacted, and a formation-plugging reaction product is formed. The first portion of solvent injected is effective to sweep the oil from a portion of the formation near the injection well, to prevent reaction and plugging of this zone of critical pressure-drop. Further, the first injection solvent displaces a large portion of the formation water from the zone immediately surrounding the injection well. Then, when the agent capable of reaction with water is injected, it tends to follow the flow paths established by the solvent, and to react with water in or adjacent to those flow paths. This creates a blocking effect in the flow paths, and causes subsequently injected solvent and driving fluid to flow around this blocked area and contact more of the formation than would have been contacted in a conventional solvent flood. However, because the first amount of solvent displaces a large portion of the water immediately surrounding the injection well, relatively very little blocking of the formation occurs near the well, thereby avoiding the creation of a high resistance to flow and resulting, undesirably high, pumping pressures which would otherwise be required for injection.

It has been found that a critical relationship exists determining the quantity of oil-miscible solvent which must be injected prior to the injection of the formation-plugging reagent. If too little solvent is injected, water will not be driven from the zone immediately surrounding the well, and the initial development of flow channels between the injection and producing wells will not proceed sufficiently to cause the injected plugging agent to find its way into these channels. On the other hand, if too much oil-miscible solvent is injected prior to the injection of the formation-plugging reactant, flow channels between the injection well and producing well may become completely established, or nearly completely established, and solvent breakthrough at the producing well may even occur. In this event, while the treatment with formation-plugging reactant will close the established flow channels, the subsequently injected solvent and driving fluid will merely by-pass the plugged zones and then return to the established flow channels beyond the plugged zone. The result is that little additional oil is recovered. On the other hand, when the correct quantity of solvent is first injected, and followed by the formation-plugging reactant, the reduction in permeability in the zone immediately surrounding the injection well is very slight, and effective plugging of the partially established flow channels is obtained. Since no flow channels exist between the plug and the producing well, upon injection of additional quantities of solvent an efficient sweep of the reservoir is obtained.

Figure 2:
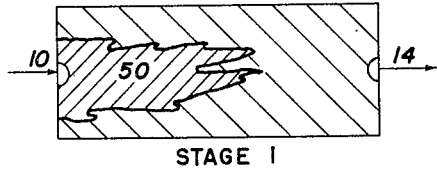
Figure 2:
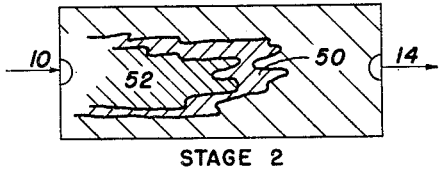
Figure 2:
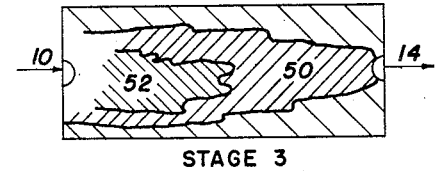
Figure 2:
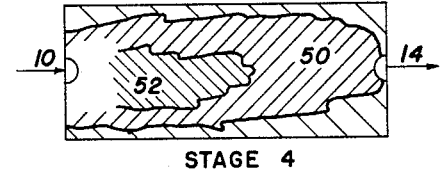

The effectiveness of the method of this invention, in comparison with the methods of the prior art, is illustrated in FIGURES 1 and 2 of the drawing, each figure of which comprises four graphs showing the sweep pattern in various stages of the process of the prior art, and the process of this invention. Referring first to FIGURE 1, at Stage 1 a portion of the solvent has been injected through well 10 into the reservoir, as represented by zone 12. Oil is produced from well 14. The usual fingering is represented at the flood front. Stage 2 represents the continuation of the conditions existing at a later intermediate point during solvent injection, and Stage 3 represents the condition existing when solvent appears at producing well 14. Stage 4 represents the condition existing when the injected fluid-to-oil ratio is the produced fluids become so high that further production is uneconomical. Much of the reservoir has not been contacted by the injected fluid at this stage in the conventional solvent flood. The extent of reservoir treated is, as has been pointed out, dependent upon the ratio of the viscosity of the petroleum produced to the viscosity of the injection solvent. Referring now to Stage 1 of FIGURE 2, shaded zone 50 represents the extent the solvent traveled through the formation during the first step of the improved process of this invention. The same conditions exist as at the same stage in the conventional process shown in FIGURE 1. The flow channels toward the producing well have been in part developed, and fingering begins to become prominent. Stage 2 of FIGURE 2 represents the conditions existing after an agent capable of reaction with water has been injected in accordance with this invention. Solvent in zone 50 has been forced further into the formation, and zone 52, containing solid or viscous products resulting from the reaction of the injected agent and the formation water, has been established. This zone is not present in the area immediately surrounding the injection well. After zone 52 has been established, solvent injection is resumed, and the solvent is driven by an injection fluid, such as water, natural gas, air, or combinations of these. The presence of plugged zone 52 forces the solvent and driving fluid to flow around it, thereby sweeping more of the formation than would have been swept at the same stage in the conventional process. Because flow channels extending from in front of the plugged zone have not been cleared, the sweep efficiency of the process is extremely high. A comparison of Stage 4 of FIGURES 1 and 2 illustrates the relative sweep efficiencies of the two processes at abandonment.

The volume of solvent injected ahead of the formation-plugging reactant in the process will depend upon the characteristics of the formation to be treated, and especially upon the ratio of the viscosity of the petroleum in the reservoir to the viscosity of the injected solvent. The quantity of solvent first injected must be within the range of one-third to one-half the quantity of solvent which, if injected, would result in solvent breakthrough at the producing well. If less than one-third of the breakthrough quantity of solvent is injected, insufficient development of the flow channels will occur, and there will be excessive plugging of the formation in the zone immediately surrounding the injection well bore. If more than one-half of the breakthrough quantity of solvent is injected, the overall efficiency of the process will be reduced by the channeling of subsequently injected solvent back of the established flow channels, after the plugged zone of the formation has been passed. The quantity of solvent which would, if injected, result in break through at the producing well, can in many instances be ascertained by inspection of reservoir conditions by those skilled in the art. In those situations where an accurate estimate cannot be made with reasonable certainty, it will be necessary to subject a reservoir sample, such as a core sample, to solvent flood, under conditions approximating those to be employed in treating the reservoir, to determine how much fluid can be injected before solvent breakthrough occurs.

Examples of the total quantity of solvent which must be injected to achieve solvent breakthrough for various types of laboratory models are set out in Table I.

*Table I*

| Type of Model | Viscosity Ratio [1] | Total Fluid Injected at Breakthrough [2] (p.v.) |
| --- | --- | --- |
| Linear, homogeneous, unconsolidated sand model | 5.0 | 0.60 |
| | 86.0 | 0.23 |
| Five spot, homogeneous, unconsolidated sand model | 1.59 | 0.58 |
| | 27.1 | 0.30 |
| Linear, segmented-stratified, unconsolidated sand model | 4.6 | 0.63 |
| | 23.1 | 0.45 |
| Linear, homogeneous, consolidated Berea-sand model | 12.0 | 0.28 |
| | 30 | 0.35 |

[1] Viscosity of oil in place/viscosity of displacing fluid.
[2] Total amount of fluid which had been injected when breakthrough occurred.

The viscosity ratio referred to is the ratio of the viscosity of the oil in place to that of the injected solvent. The total fluid injected indicates the volume of fluid (solvent and/or driving fluid) which had been injected when breakthrough occurred. It will be seen that the quantity of solvent injected prior to the injection of formation-plugging material will typically be in the range of about 7% to 20% of the reservoir pore volume. Where the method is carried out in reservoirs which have been previously subjected to other secondary-recovery processes, and flow channels between injection and producing wells have become partially established, the initial volume of solvent injection can be smaller. Where the slug of solvent injected becomes less than about 5 pore-volume percent, it is preferred to employ a material, such as methyl ethyl ketone, which has some solubility in water to insure adequate removal of water from the zone immediately surrounding the well bore. The quantity of formation-plugging reagent injected should be in the range of 0.03 to 0.1 reservoir pore volume. The quantity of solvent injected after the plugging reagent, but before the displacing fluid, should be not less than about 0.05 reservoir pore volume.

As a specific example of the method of this invention, a sandstone reservoir having a permeability of 50 millidarcies, an oil saturation of 60% and a brine saturation of 40%, is treated in accordance with this invention. A core sample taken from the reservoir is reconstituted to have an oil concentration of 60% produced crude oil and 40% of a brine compounded to be similar to the formation brine. This core is flooded with liquid propane, and breakthrough occurs after the injection of 0.24 pore volume of propane. The reservoir is produced by injecting into an input well 0.08 pore volume of propane, 0.05 pore volume of a 30% solution of beta-propiolactone in kerosene, another 0.06 pore volume of propane, and floodwater, in sequence. Reservoir fluids are produced from a producing well.

The embodiments of the invention in which an exclusive property or privilege is claimed are defined as follows:

1. The method of recovering petroleum from subterranean reservoirs, containing petroleum and water, penetrated by an injection well and a producing well, comprising injecting through said injection well and into said formation a quantity of light anhydrous liquid solvent having a high solubility in crude oil, said quantity being in the range of one-third to one-half the volume of solvent which, if injected, would cause solvent breakthrough at the producing well, next following the injection of said solvent injecting through said injection well 0.03 to 0.10 pore volume of a reagent capable of reaction in the presence of water to form a formation-plugging product, then injecting through said injection well an additional quantity not less than about 0.05 reservoir pore volume of a solvent as aforedefined, then driving said injected fluids by the injection through said injection well of a displacing fluid, and producing oil from said producing well.

2. The method in accordance with claim 1 in which said solvent is a low-molecular-weight petroleum fraction.

3. The method in accordance with claim 2 in which said displacing fluid is water.

4. The method in accordance with claim 3 in which said solvent comprises liquefiable petroleum gas, and the pressure of injection is in excess of the pressure required to maintain said liquefiable petroleum gases as a liquid at reservoir temperature.

5. The method in accordance with claim 2 in which said plugging agent is beta-propiolactone incorporated in the amount of 10 to 50% by weight in a petroleum fraction.

6. The method in accordance with claim 2 in which said plugging agent is gaseous.

7. The method in accordance with claim 5 in which said plugging agent is silicon tetrafluoride.

References Cited in the file of this patent

UNITED STATES PATENTS

| | | |
|---|---|---|
| 2,669,306 | Teter et al. | Feb. 16, 1954 |
| 2,808,886 | Bail et al. | Oct. 8, 1957 |